United States Patent [19]

DiPersio

[11] Patent Number: 5,452,518
[45] Date of Patent: Sep. 26, 1995

[54] METHOD OF CORRECTING FOR AXIAL ERROR COMPONENTS IN MAGNETOMETER READINGS DURING WELLBORE SURVEY OPERATIONS

[75] Inventor: Richard D. DiPersio, Houston, Tex.

[73] Assignee: Baker Hughes Incorporated, Houston, Tex.

[21] Appl. No.: 155,027

[22] Filed: Nov. 19, 1993

[51] Int. Cl.$^6$ .................................................. E21B 47/022
[52] U.S. Cl. ................................. 33/304; 33/301; 33/313
[58] Field of Search ............................. 33/304, 301, 302, 33/303, 313

[56] References Cited

U.S. PATENT DOCUMENTS

| | | |
|---|---|---|
| Re. 33,708 | 10/1991 | Roesler . |
| 2,593,070 | 4/1952 | Stuart, Jr. . |
| 3,587,175 | 6/1971 | Armistead . |
| 3,753,296 | 8/1973 | Van Steenwyk . |
| 3,791,043 | 2/1974 | Russell . |
| 3,862,499 | 1/1975 | Isham et al. . |
| 3,896,412 | 7/1975 | Rohr . |
| 3,935,642 | 2/1976 | Russell . |
| 4,021,774 | 5/1977 | Asmundsson et al. . |
| 4,071,959 | 2/1978 | Russell et al. . |
| 4,083,117 | 4/1978 | Russell et al. . |
| 4,163,324 | 8/1979 | Russell et al. . |
| 4,174,577 | 11/1979 | Lewis . |
| 4,199,869 | 4/1980 | Van Steenwyk . |
| 4,345,454 | 8/1982 | Brown . |
| 4,414,753 | 11/1983 | Moulin et al. . |
| 4,433,491 | 2/1984 | Ott et al. . |
| 4,472,884 | 9/1984 | Engebretson . |
| 4,510,696 | 4/1985 | Roesler . |
| 4,559,713 | 12/1985 | Ott et al. . |

(List continued on next page.)

FOREIGN PATENT DOCUMENTS

| | | |
|---|---|---|
| 193230 | 8/1985 | European Pat. Off. . |
| 1240830 | 7/1971 | United Kingdom . |
| 1578053 | 10/1980 | United Kingdom . |
| 2086055 | 5/1982 | United Kingdom . |
| 2122751 | 1/1984 | United Kingdom . |
| 2138141 | 10/1984 | United Kingdom . |
| 2158587 | 11/1985 | United Kingdom . |
| 2185580 | 7/1987 | United Kingdom . |

OTHER PUBLICATIONS

Encyclopedia Britannica, "Geomagnetism", vol. 10, 1960, p. 171.

Composite Catalog of Oil Field Equipment and Services, vol. 3, 1974–1975.

Alfred Hine, B.Sc., "Magnetic Compasses and Magnetometers", 1968, pp. 1–7, 105–107.

A. C. Scott, et al, "Determining Downhole Magnetic Interference on Directional Surveys," Society of Petroleum Engineers, 1979.

C. J. M. Wolf, et al, "Borehole Position Uncertainty–Analysis of Measuring Methods and Derivation of Systematic Error Model", Journal of Petroleum Technology, Dec., 1981, pp. 2339–2350.

J. Edwards F. Pernet, et al, "Magnetic Properties of Non-magnetic Drill Collars and Their Relation to Survey Compass Error", Geoexploration, 1979, pp. 229–241.

T. G. Thometz, "Determining Non–Magnetic Survey Collar Requirements", World Oil, vol. 182, No. 6, May 1976, pp. 79–80.

B. J. S. Deo, "An Analysis of the Angels of Rotation and Azimuth Using M. W. D.", Gearhart Geodata Services, Ltd. (Date Unknown).

C. A. Johancsik, et al, "Application of Measurement While Drilling in a Shallow, Highly Deviated Drilling Program", Science and Technology, Jun. 1984, pp. 521–531.

Primary Examiner—Christopher W. Fulton
Attorney, Agent, or Firm—Melvin A. Hunn

[57] ABSTRACT

A method is provided for deriving wellbore azimuth in a manner which reduces the impact of axial magnetic field errors, which utilizes a plurality of estimates of the axial component of the magnetic field which are combined in a manner which emphasizes the better estimates and deemphasizes the poorer estimates.

12 Claims, 6 Drawing Sheets

U.S. PATENT DOCUMENTS

| | | |
|---|---|---|
| 4,637,480 | 1/1987 | Obrecht et al. . |
| 4,649,349 | 3/1987 | Chiron et al. . |
| 4,682,421 | 7/1987 | Van Dongen et al. . |
| 4,709,486 | 12/1987 | Walters . |
| 4,761,889 | 8/1988 | Cobern et al. . |
| 4,813,214 | 3/1989 | Barnard et al. . |
| 4,813,274 | 3/1989 | DiPersio et al. . |
| 4,819,336 | 4/1989 | Russell . |
| 4,836,301 | 6/1989 | Van Dongen et al. . |
| 4,875,014 | 10/1989 | Roberts et al. . |
| 4,894,923 | 1/1990 | Cobern et al. . |
| 4,956,921 | 9/1990 | Coles . |
| 4,999,920 | 3/1991 | Russell et al. . |
| 5,012,412 | 4/1991 | Helm . |
| 5,034,929 | 7/1991 | Cobern et al. . |
| 5,103,177 | 4/1992 | Russell et al. . |
| 5,155,916 | 10/1992 | Engebretson . |
| 5,321,893 | 6/1994 | Engebretson ............................ 33/304 |

METHOD OF CORRECTING FOR AXIAL ERROR COMPONENTS IN MAGNETOMETER READINGS DURING WELLBORE SURVEY OPERATIONS

BACKGROUND OF THE INVENTION

1. Field of the Invention

The present invention relates in general to survey operations in an oil and gas wellbore, and in particular relates to techniques for obtaining more accurate magnetometer data.

2. Description of the Prior Art

In order to understand the present invention, it is important to establish the definitions of terminology utilized in wellbore survey operations. Surveys are used to determine the position of a wellbore within the earth. The orientation of the wellbore is determined at a particular depth by the deviation of the wellbore from a predetermined axis. The deviations may be measured with respect to two reference vectors:

(1) the earth's gravitational field vector "G"; and
(2) the earth's magnetic field vector "H".

Figure 1:
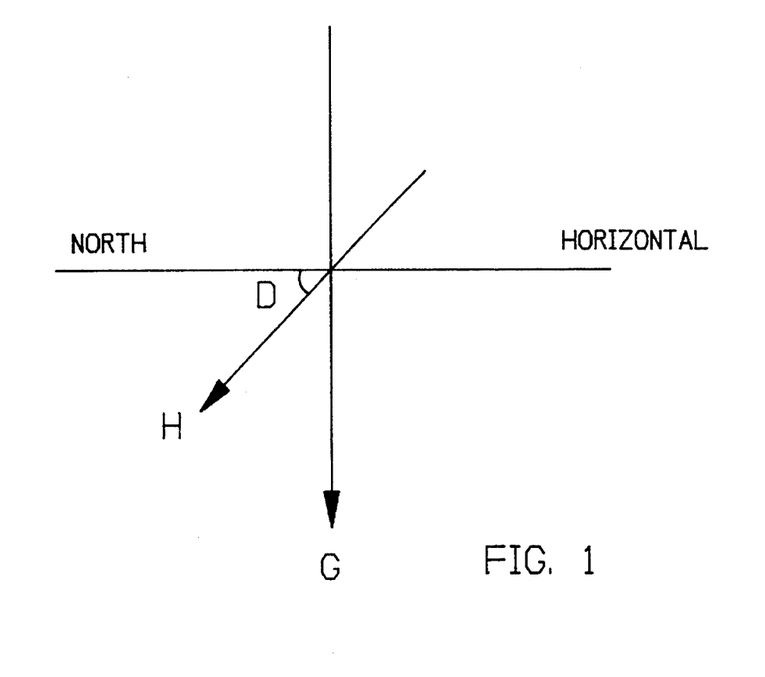
FIG. 1 is a simplified graphical depiction of the earth's field vectors.

In accordance with this convention, G is positive in the vertical downward direction, while H is positive in the north direction and is inclined by a dip angle D below the horizon, as is shown in FIG. 1.

In the frame of reference established by the earth's gravitational field vector G, the deviation is identified as an inclination "I" angle, which is the angle between the longitudinal axis of the drillstring and the earth's gravitational field vector G. In the frame of reference established by the earth's magnetic field vector H, the deviation is identified as a magnetic azimuth "A", which is the angle between the horizontal component of the longitudinal axis of the drillstring and the horizontal component of the earth's magnetic field vector H.

Wellbore survey operations also frequently utilize the dip angle "D", which is the complement of the angle between the earth's magnetic field vector H and the earth's gravitational field vector G (that is, 90 degrees less the angle between vectors H and G). The dip angle D is available in look-up tables for all latitudes and longitudes on the earth's surface.

In conventional wellbore survey operations, accelerometers are utilized to measure the direction of the earth's gravitational field vector G, and magnetometers are utilized to measure the earth's magnetic field vector H. Each vector, includes x-axis, y-axis, and z-axis components.

Figure 2:
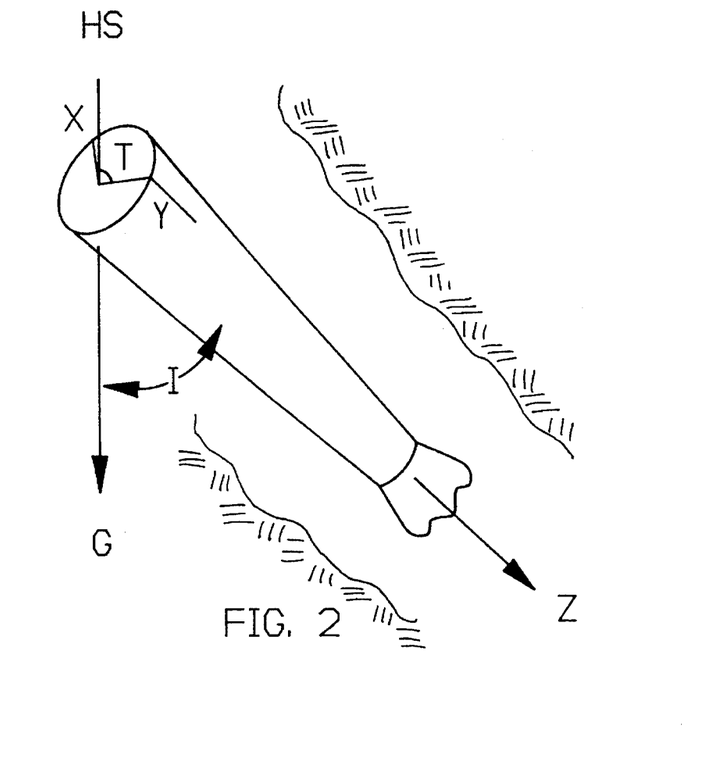
FIG. 2 provides a view of the Cartesian coordinate system which is established with reference to the longitudinal axis of a drillstring disposed within a wellbore.

In order to understand the techniques of the present invention for compensating for the magnetic field biasing error "e", it is important first to understand the coordinate systems utilized in surveying operations. FIG. 2 provides a view of the Cartesian coordinate system which is established relative to the bottomhole assembly of a drillstring. The z-axis of the coordinate system is in alignment with the longitudinal axis of the bottom hole assembly. The x-axis and y-axis are perpendicular to the z-axis, and are fixed in position with respect to the bottom hole assembly. Therefore, rotation of the bottom hole assembly relative to the z-axis also rotates the x-axis and the y-axis by an amount measured in terms of tool face angle "T". Note that the inclination angle I provides a measure of the position of the bottomhole assembly of a drillstring relative to the gravity field vector G.

Figure 3:
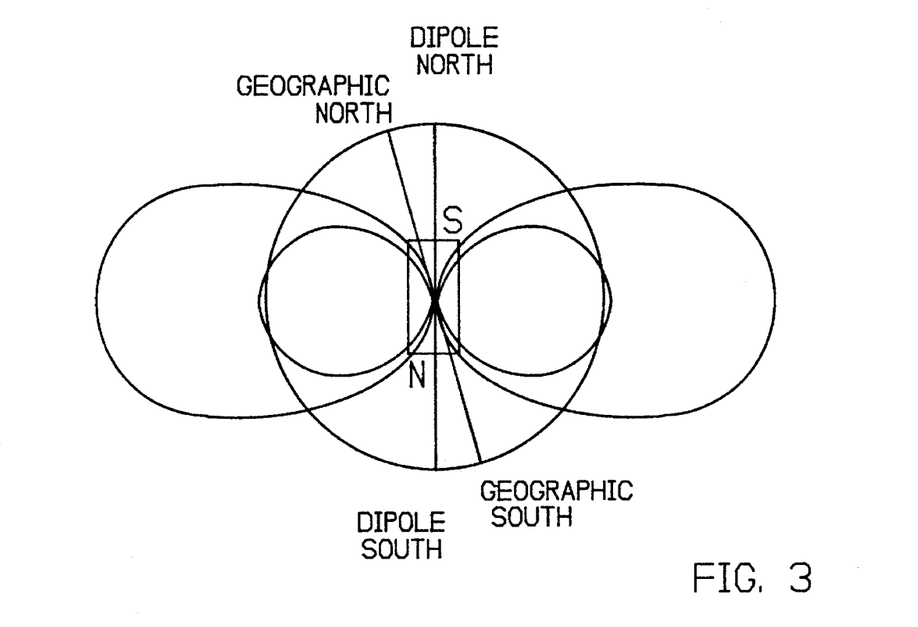
FIG. 3 provides a simplified view of the earth's magnetic field.
Figure 4:
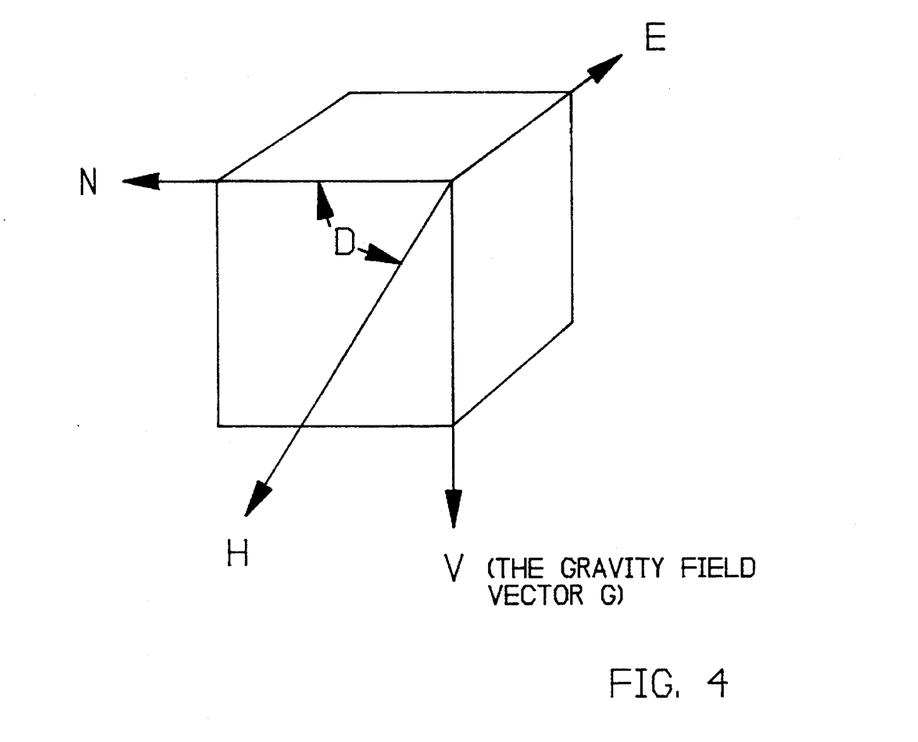
FIG. 4 provides a view of the north-east-vertical coordinate system which is frequently utilized when discussing the earth's magnetic field.

An alternative coordinate system is frequently utilized when the earth's magnetic field is discussed. The earth's field can be approximated by a magnetic dipole, such as that shown in FIG. 3. Note that the earth's North magnetic pole is the pole towards which the north end of a compass needle is attracted: it is the south pole of the dipole. When the earth's magnetic field is discussed, it is common to employ a N-E-V (North-East-Vertical) coordinate system. By convention, the earth's magnetic field H points toward the north magnetic pole, inclined by a dip angle D below the horizon in the northern hemisphere. FIG. 4 provides a view of this coordinate system. In this coordinate system, the V-axis is aligned with the gravity field vector G, and the x-y plane is parallel with the "horizon".

During survey operations, magnetometer readings are taken along the three axes to determine the magnetic field vector H components: these measurements are identified as $H_x$, $H_y$, and $H_z$. Accelerometer readings are taken along the three axes to determine the gravitational field vector G components: these measurements are identified as $G_x$, $G_y$, and $G_z$. Since these vectors have both a direction and a magnitude, these tri-axial measurements will have to be scaled, or calibrated, to accurately reflect the magnitude of the vector they represent.

Figure 5:
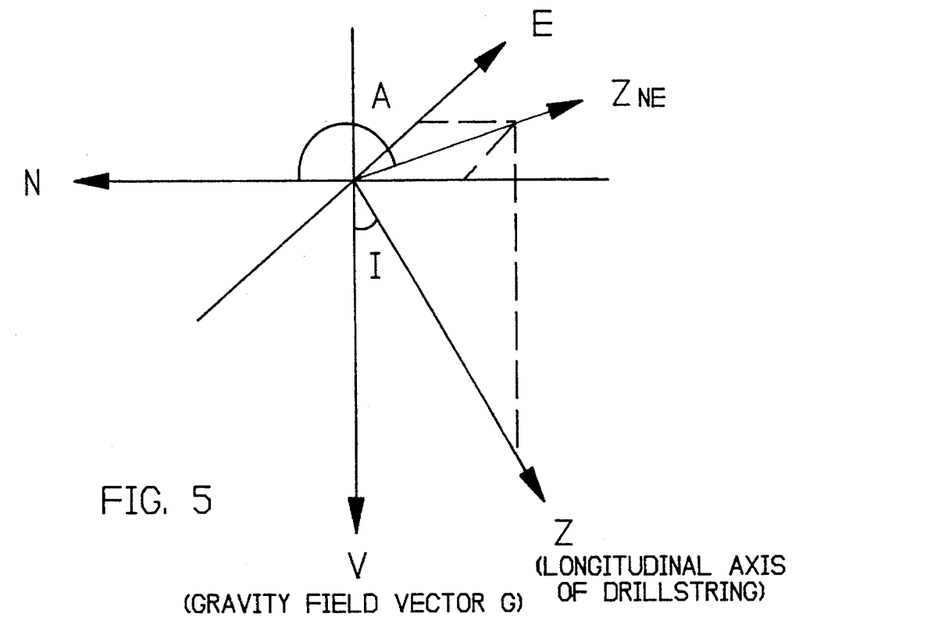
FIGS. 5 and 6 provide graphical views of the azimuth and inclination angles relative to coordinate systems.
Figure 6:
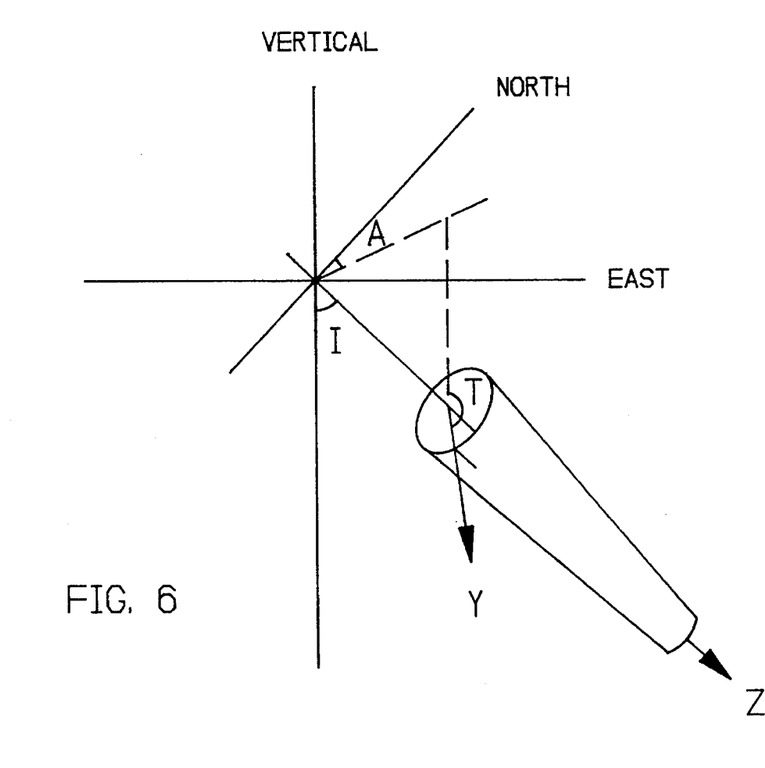

Survey tools utilizes these x-y-z arrays of accelerometers and magnetometers to determine the directions and magnitudes of the H and G vectors in the x-y-z frame of reference. This information is used to determine the tool's "attitude", expressed by the inclination angle I, and the azimuth angle A, as is shown in FIG. 5 and FIG. 6.

Once a set of values for $H_x$, $H_y$, $H_z$, $G_x$, $G_y$, and $G_z$ are determined for a specific wellbore depth, the azimuth A and inclination I of the wellbore at that depth can be determined. Also, the value of the magnetic dip angle D can be calculated. The magnetic dip angle D is the complement angle between the earth's magnetic field vector and the gravitational field vector G. An expected magnetic dip angle D can be looked up in reference tables based on the wellsite's longitude and latitude. The sensors are also utilized to determine the tool face angle T. The three accelerometers are normally used to find I and G, the magnetometers are used to find H, and a combination of measurements from all sensors are required to calculate A and D.

Once the azimuth A and inclination I are determined for the wellbore at a number of specific depths, a directional map of the wellbore can be plotted. This directional map shows how far, and in what direction, the wellbore is deviated from the vertical and magnetic north, and ultimately where the well is bottomed.

In order to provide the greatest accuracy in magnetic field measurements, the wellbore surveying tool is typically housed in a non-magnetic subassembly. Additionally, surrounding subassemblies may also be constructed of a non-magnetic material. However, the drillstring, including these non-magnetic subassemblies, can nonetheless become magnetized during drilling operations, to such an extent that the accuracy of the magnetic field measurements is severely impaired. Any magnetization of the bottomhole assembly in the vicinity of the surveying equipment will introduce a biasing error "e", which is an undesired error component contained in magnetometer readings due to the magnetization of the drillstring. The biasing error includes the following two types of error components:

(1) an axial biasing error $e_z$; and
(2) a transverse (or "cross-axial") biasing error $e_{xy}$.

Figure 7A:
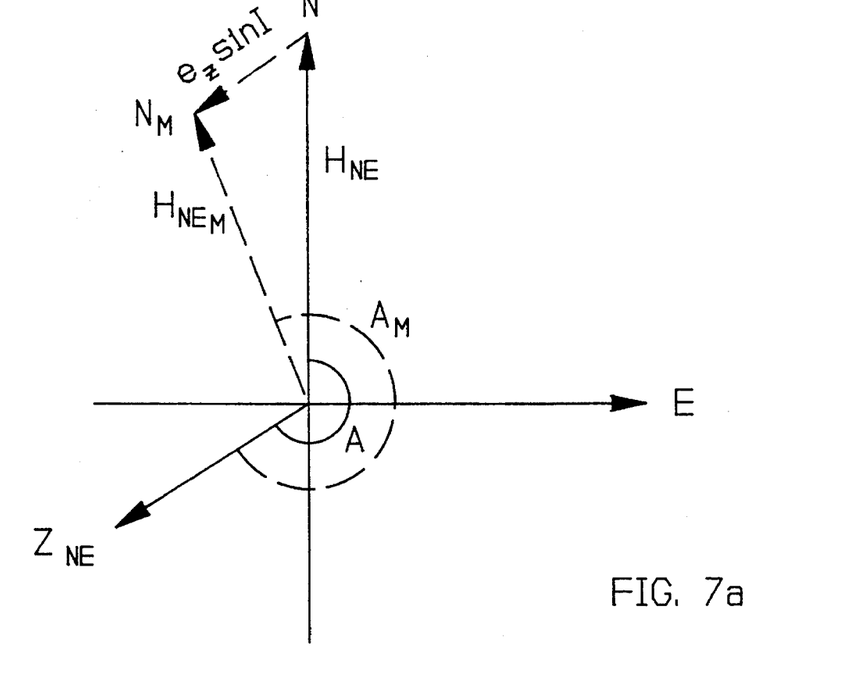
FIGS. 7a and 7b provide a graphical depiction of the impact of an axial magnetic biasing error component ($e_z$) upon the measurement and calculation of wellbore azimuth.
Figure 7B:
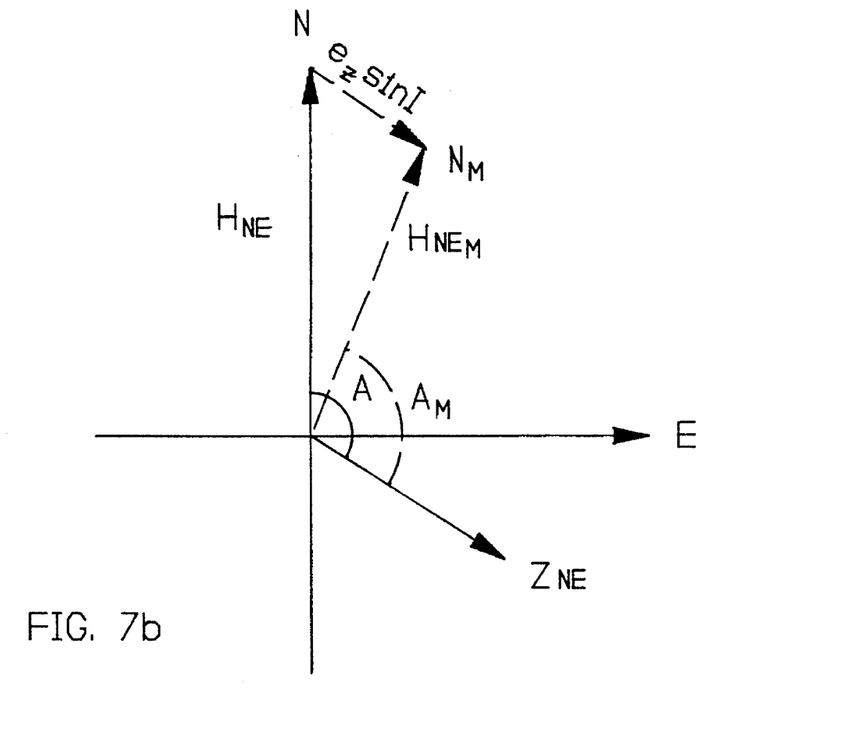

FIGS. 7a and 7b graphically depict the effects of an axial magnetic field bias "$e_z$" on the determination of azimuth A.

As is shown in FIGS. 7a and 7b, the effect of the axial error field $e_z$ is to typically increase apparent azimuth $A_m$ if the hole has a westward component as is shown in FIG. 7a, or to typically decrease apparent azimuth $A_m$ if the hole is eastbound, as is shown in FIG. 7b. In either case, the apparent bottomhole location is moved further north. This is the typical case for boreholes located in the northern hemisphere. When undesired spurious magnetization is present, magnetization and accelerometer readings provide values for the measured horizontal component of the magnetic field $H_{NEM}$ and measured Azimuth $A_m$, but we wish to find the unbiased horizontal component of the magnetic field $H_{NE}$ and especially an unbiased azimuth A.

SUMMARY OF THE INVENTION

It is one objective of the present invention to provide a method of surveying a wellbore utilizing a sensor array located within a drillstring, wherein wellbore azimuth is calculated utilizing an estimate of the axial component of the magnetic field, which is free of many types of magnetic field error, to provide a measure of the wellbore azimuth which is substantially error-free of sensor and axial magnetic field biasing error components.

It is another objective of the present invention to provide a method of surveying in a wellbore, at a particular geographic location, utilizing a sensor array located within a drillstring within the wellbore, which utilizes measurements taken with the sensor array in combination with nominal values for the magnetic field strength and/or magnetic dip angle to calculate a plurality of estimates of the axial component of the magnetic field, which are then blended or combined to provide a "best" estimate of the axial component of the magnetic field at the particular geographic location, and then utilizing the best estimate of the axial component of the magnetic field to calculate wellbore azimuth, in a manner which renders the wellbore azimuth calculation free of the effects of many magnetic field errors.

It is still another objective of the present invention to provide a method of surveying a wellbore, at a particular geographic location, utilizing a sensor array located within a drillstring within the wellbore, which calculates a plurality of estimates of the axial component of the magnetic field, and then generates a composite estimate of the axial component of the magnetic field in a manner which emphasizes the estimates of the axial component of the magnetic field in proportion to a numerical indication of the degree of confidence of accuracy of the values for the particular estimates, thus assuring that a "best" estimate of the axial component of the magnetic field is utilized in calculating the wellbore azimuth, thus ensuring that the measure of wellbore azimuth is substantially free of the effects of many magnetic field error components.

These and other objectives are achieved as is now described. The present invention is directed to a method of surveying a wellbore, at a particular geographic location, utilizing a sensor array which is located within a drillstring within the wellbore. The sensor array is utilized to measure the magnetic and gravitational fields at a particular depth. Preferably, these measurements are used in combination with the nominal (or estimated) values for magnetic field strength and magnetic dip angle, to derive a plurality of estimated values of the axial component of the magnetic field which satisfy particular predefined criteria. In the preferred embodiment of the present invention, one axial component of the magnetic field $H_{Z1}$ is calculated which matches the calculated magnetic field strength H to nominal magnetic field strength $\underline{H}$, at a particular geographic location. In this preferred embodiment, another estimated value of the axial component of the magnetic field $H_{Z2}$ is calculated to match the calculated dip angle D to nominal dip angle $\underline{D}$ at the particular geographic location.

In the preferred embodiment of the present invention, the plurality of estimates of the axial component of the magnetic field are combined, or blended, in a manner to derive a "best estimate" for the axial component of the magnetic field at that particular location. More particularly, in the present invention, numerical confidence indicators are calculated for each estimate to provide a numerical indication of the degree of confidence of the accuracy of the estimate. In the preferred embodiment of the present invention, one confidence indicator is generated for each estimate. Then, preferably, the confidence indicators are utilized to generate a weighted average which represents the "best estimate" for the axial component of the magnetic field.

Additional objectives, features and advantages will be apparent in the written description which follows.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Borehole orientation is the direction of a vector tangent to the borehole trajectory. It is associated with three angular parameters. Azimuth A is the angle between north N and the projection of the borehole orientation vector onto the horizontal plane. Inclination I is the angle between vertical V and the borehole orientation vector. Highside toolface HS is the angle between the high side of the borehole and a scribe line reference on the side of the sensor package.

Borehole angle parameters are typically determined using a sensor package that provides accelerometer and magnetometer measurements along the axes of a coordinate system defined as follows. The z-axis is oriented forward along the borehole axis. The x-axis and y-axis are defined to be the two cross-axial axes perpendicular to the borehole z-axis. The y-axis points in the direction from the center of the borehole toward the tool scribe line.

The sensor package accelerometer and magnetometer readings are measurements of the components of the earth's geomagnetic field in the XYZ-coordinate system. The earth's gravitational field has magnitude G in the vertical direction. The earth's magnetic field has magnitude H, and is oriented north, at the dip angle D. These parameters are location-dependent.

The accelerometer measurements associated with the three axes are $G_X$, $G_Y$, and $G_Z$. In terms of the earth's field parameters and the drilling angles, they can be expressed as:

$$G_X = -G \cdot \sin I \cdot \sin HS \quad (1)$$

$$G_Y = -G \cdot \sin I \cdot \cos HS \quad (2)$$

$$G_Z = G \cdot \cos I \quad (3)$$

The magnetometer measurements associated with the three axes are $H_X$, $H_Y$, and $H_Z$. In terms of the earth's field parameters and the drilling angels, they can be expressed as:

$$H_X = H \cdot \cos D \cdot \sin HS \cdot \cos I \cdot \cos A - H \cdot \sin D \cdot \sin HS \cdot \sin I + H \cdot \cos D \cdot \cos HS \cdot \sin i\, A \quad (4)$$

$$H_Y = H \cdot \cos D \cdot \cos HS \cdot \cos I \cdot \cos A - H \cdot \sin D \cdot \cos HS \cdot \sin I - H \cdot \cos D \cdot \sin HS \cdot \sin A \quad (5)$$

$$H_Z = H \cdot \cos D \cdot \sin I \cdot \cos A + H \cdot \sin D \cdot \cos I \quad (6)$$

The total earth's field parameters can be calculated from the accelerometer and magnetometer measurements using the following equations:

$$G = (G_X^2 + G_Y^2 + G_Z^2)^{0.5} \quad (7)$$

$$H = (H_X^2 + H_Y^2 + H_Z^2)^{0.5} \quad (8)$$

$$\tan D = (G_X H_X + G_Y H_Y + G_Z H_Z) \div [(G_Y H_Z - G_Z H_Y)^2 + (G_X H_Z - G_Z H_X)^2 + (G_X H_Y - G_Y H_X)^2]^{0.5} \quad (9)$$

Inclination and highside toolface can be calculated using the accelerometer measurements, in accordance with the following formulas:

$$\tan I = (G_X^2 + G_Y^2)^{0.5} \div G_Z \quad (10)$$

$$\tan HS = (-G_X) \div (-G_Y) \quad (11)$$

Azimuth can be calculated using the accelerometer and magnetometer measurements, as follows:

$$\tan A = (G_X^2 + G_Y^2 + G_Z^2)^{0.5} \cdot (H_Y G_X - H_X G_Y) \div [H_Z (G_X^2 + G_Y^2) - G_Z (H_X G_x + H_Y G_y)] \quad (12)$$

The magnetometer measurements can be corrupted by magnetic interferences. Axial magnetic interference is typically associated with the drillstring. It is oriented along the drillstring axis, and produces errors in the $H_Z$ measurement. This degrades the accuracy of the calculated azimuth.

The degradation of the azimuth measurement due to axial magnetic interference can be corrected by the following method, using a sensor package which provides accelerometer and magnetometer measurements.

The method utilizing the nominal (or "expected") values for the total magnetic field strength "$\underline{H}$" and dip angle "$\underline{D}$", which are available in look-up tables for all latitudes and longitudes on the earth's surface or in contour maps. There is a certain amount of uncertainty associated with these nominal values, since they are both location and time dependent.

The method of the present invention consists of several major steps:

(1) determining an estimated value $H_{Z1}$ to match calculated magnetic field strength H to nominal magnetic field strength $\underline{H}$;

(2) determining an estimated value $H_{Z2}$ to match calculated dip angle D to nominal dip angle $\underline{D}$;

(3) determining a best estimate $H_{ZE}$ from $H_{Z1}$ and $H_{Z2}$; and (4) calculating azimuth A, which is free of axial magnetic field biasing errors, using $H_{ZE}$.

Calculation of $H_{Z1}$

The value of $H_{Z1}$ is calculated to give the best match to the nominal or "estimated" magnetic field strength $\underline{H}$. Using $\underline{H}$ and the cross-axial magnetometer measurements, the value of $H_{Z1}$ is determined from the relationship:

$$H_{Z1} = (\underline{H}^2 - H_X^2 - H_Y^2)^{0.5} \quad (13)$$

Actually, there are two solutions for equation number 13. They are equal in magnitude and opposite in sign. In most cases, it is fairly easy to determine which of the two solutions is correct: the correct solution should give good agreement between the calculated dip angle D and the nominal dip angle $\underline{D}$; it should also result in a calculated azimuth A which is consistent with the expected azimuth and the uncorrected azimuth measurement.

$H_{Z1}$ is an estimate of the axial magnetic field strength. The uncertainty associated with this estimate is a function of both the borehole orientation and the uncertainty associated with the value of $\underline{H}$. If the borehole is oriented along the direction of the earth's magnetic field (i.e., "drilling along the dip angle"), both $H_X$ and $H_Y$ are 0, and the uncertainty in $H_{Z1}$ is the same as the uncertainty in $\underline{H}$. The uncertainty in $H_{Z1}$ increases as the angle between the borehole and the earth's magnetic field increases. It reaches a maximum when the borehole is perpendicular to the earth's magnetic field.

It is desirable to quantify our confidence in the $H_{Z1}$ estimate. The following discussion outlines a method to achieve this. The total magnetic field strength is:

$$H = (H_X^2 + H_Y^2 H_{Z2})^{0.5} \quad (14)$$

Figure 8:
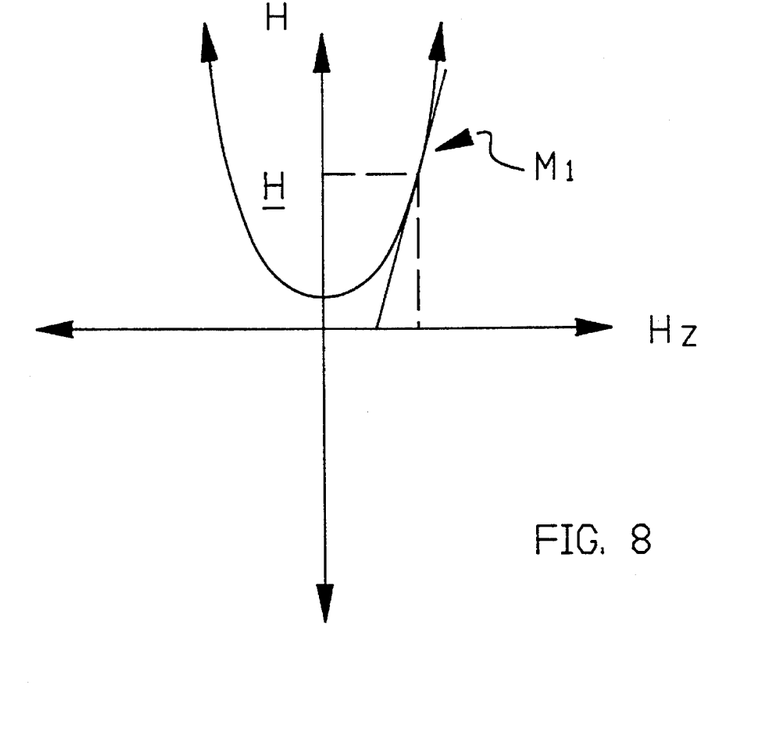
FIG. 8 is a graph which is utilized to describe the technique of the present invention for quantifying the degree of confidence in the value derived for $H_{Z1}$, a first estimate of the axial component of the magnetic field.

If H is plotted as a function of $H_Z$, while $H_X$ and $H_Y$ are held constant at the measured values, the result is a parabola, which is shown in FIG. 8. The slope of this curve is the sensitivity of H to $H_Z$. If the slope is fairly steep, it means that an incremental change in $H_Z$ results in a relatively large change in H. Another way to look at this is that when the slope is fairly steep, any uncertainty in the H that we are using relates to a relatively smaller uncertainty in $H_{Z1}$. This means that the relative confidence in our $H_{Z1}$ estimate is proportional to the magnitude of the slope of the H versus $H_Z$ curve at the point $H = \underline{H}$.

Calculation of $H_{Z2}$

The value $H_{Z2}$ is calculated to give the best match to the nominal magnetic dip angle $\underline{D}$. Using $\underline{D}$, the accelerometer measurements, and the cross-axial magnetometer measurements ($H_X$ and $H_Y$), the value $H_{Z2}$ is determined from the relationship:

$$\tan D = G_X H_X + G_Y H_Y + G_Z H_{Z2} \div [(G_Y H_{Z2} - G_Z H_Y)^2 + (G_X H_{Z2} - G_Z H_X)^2 + (G_X H_Y - G_Y H_X)^2]^{0.5} \quad (15)$$

The above equation can be solved numerically using an iterative procedure to find the value for $H_{Z2}$. As with the calculation of $H_{Z1}$, this equation may have more than one solution within the range of reasonable values for $H_{Z2}$ (i.e., $-1.1 \cdot \underline{H} < H_{Z2} < 1.1 \cdot \underline{H}$).

Figure 9:
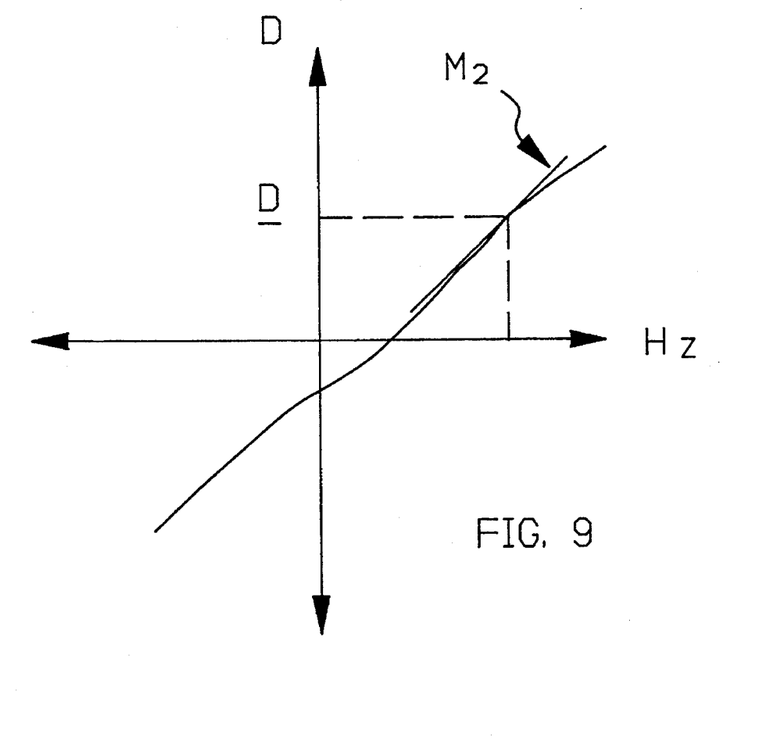
FIG. 9 is a graph which is utilized to describe the technique of the present invention for quantifying the degree of confidence in the value derived for $H_{Z2}$, a second estimate of the axial component of the magnetic field.

It is desirable to quantify our confidence in the $H_{Z2}$ estimate. Following the same reasoning applied earlier, the relative confidence in our $H_{Z2}$ estimate is proportional to the magnitude of the slope of the D versus $H_Z$ curve at the point $D=\underline{D}$, which is shown in FIG. 9.

Calculation of $H_{ZE}$

The estimated axial magnetic field is calculated as:

$$H_{ZE} = (C_1 \cdot H_{Z1} + C_2 \cdot H_{Z2}) \div (C_1 + C_2) \quad (16)$$

$C_1$ and $C_2$ are weighing factors which are inversely proportional to the uncertainty in $H_{Z1}$ and $H_{Z2}$ respectively. Dividing by the sum of $C_1$ and $C_2$ insures proper normalization of the resulting $H_{ZE}$. $C_1$ is proportional to the slope of the H versus $H_Z$ curve evaluated at $H=\underline{H}$. $C_2$ is proportional to the slope of the D versus $H_Z$ curve evaluated at $D=\underline{D}$.

In one embodiment of the present invention, the weighing factors $C_1$ and $C_2$ are set to the exact values of the slope $M_2$ as determined from FIG. 8 and slope $M_2$ as determined from FIG. 9, respectively, as follows:

$$C_1 = M_1 \quad (17)$$

$$C_2 = M_2 \quad (18)$$

In an alternative embodiment the weighing factors $C_1$ and $C_2$ are derived in a manner which is in part dependent upon the margin of error associated with the source of the value utilized for the nominal magnetic field strength $\underline{H}$ and the value utilized for the nominal dip angle $\underline{D}$. For example, if a chart is utilized to derive the nominal value of the magnetic field strength $\underline{H}$ for a particular latitude and longitude on the earth's surface, the chart's margin of error (for example, plus or minus three milligauss) is identified and utilized in deriving the weighing factor $C_1$ in accordance with the following formula, where $M_1$ is the slope derived from the graph of FIG. 8, and $\sigma_H$ is utilized to represent the margin of error associated with the source of information from which the nominal magnetic field $\underline{H}$ is derived:

$$C_1 = (M_1 \div \sigma_H)^2 \quad (19)$$

The source of the nominal magnetic field strength $\underline{H}$ may be charts, computer programs, and measurements derived utilizing surface sensors such as a proton magnetometer sensor. These sources of nominal values for the magnetic field strength $\underline{H}$ each have their own associated margin of error, with a nominal value derived from a surface measurement utilizing a proton magnetometer providing a very low margin of error, and less precise sources such as charts having a fairly high margin of error. A source of information which has a very low margin of error should be accorded greater weight in calculating $H_{ZE}$ than that accorded to a source of the nominal value of $\underline{H}$ which has a greater margin of error.

The same is true for the nominal dip angle $\underline{D}$. A source for the nominal value which has a larger margin of error should be accorded less weight than a source for the nominal value of the dip angle $\underline{D}$ which has a lesser margin of error. Accordingly, the weighing factor $C_2$ is determined in accordance with the following formula, wherein $M_2$ is representative of the slope derived from the graph of FIG. 9, and $\sigma_H$ is representative of the margin of error associated with the source of the nominal value for the dip angle $\underline{D}$:

$$C_2 = (M_1 \div \sigma_H)^2 \quad (19)$$

Figure 10A:
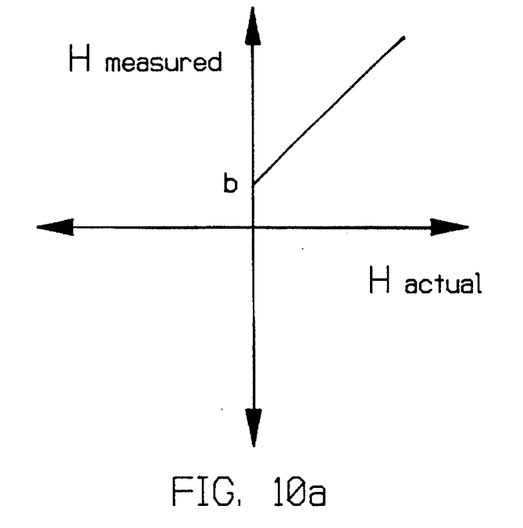
FIGS. 10a, b, and c depict different types of sensor error.
Figures 10B, 10C:
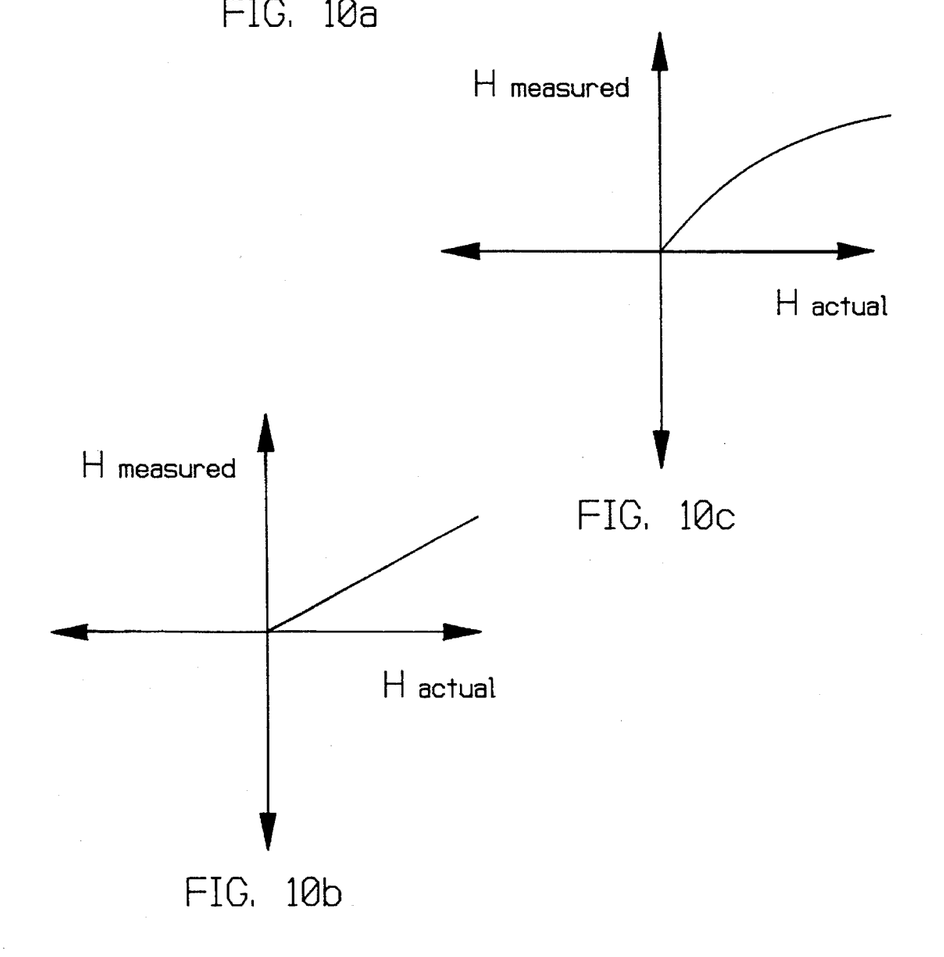

The present invention is extremely advantageous since it eliminates the influence of all types of multiple error sources, including "sensor errors" and "axial magnetic interference". Sensor errors are errors which are associated with the operation of the magnetometers disposed within the sensor array, and include (1) bias errors which are defined as some positive or negative bias present in the axial magnetic field sensors which render all measurements of the axial magnetic field made by the magnetic sensor inaccurate by a constant amount. More precisely, this "bias error" represents the "b" component (in the function Y=MX+b) in the graph of FIG. 10a which depicts the actual magnetic field versus the measured magnetic field. Another type of sensor error is a "scale factor" error which is depicted in FIG. 10b. A still different type of sensor error is a "nonlinearity" in the relationship between the actual magnetic field and the measured magnetic field, which is depicted in FIG. 10c.

The "axial magnetic interference" type of bias error represents the corrupting influence of a spurious magnetic field source upon the measured magnetic field, which can originate from drillstring magnetization, as discussed above, or magnetic anomalies presented by magnetic components disposed axially in the wellbore, such as those found in wellbore tubulars such as casing in the hole being drilled.

The present invention eliminates (1) the undesirable and corrupting influence of "sensor" errors, including bias errors, scaling factor errors, and nonlinearity of the magnetometer sensors as well as axial magnetic interference, such as that developed due to drillstring magnetization, by utilizing the best possible estimate of the axial component of the magnetic field in lieu of the actual measurement of the axial component of the magnetic field, thus greatly enhancing the accuracy of survey operations.

What is claimed is:

1. A method of surveying a wellbore, at a particular geographic location, utilizing a sensor array located within a drillstring within said wellbore, comprising:

measuring magnetic and gravitational fields with said sensor array at a particular depth;

from measurements taken with said sensor array at said particular depth, determining an estimated value of an axial component of magnetic field $H_{Z1}$ to match calculated magnetic field strength H to nominal magnetic field strength $\underline{H}$ at said particular geographic location;

from measurements taken with said sensor array at said particular depth, determining an estimated value of an axial component of magnetic field $H_{Z2}$ to match calculated dip angle D to nominal dip angle $\underline{D}$ at said particular geographic location;

determining a best estimate of said axial component $H_Z$ of said magnetic field at said particular geographic location from $H_{Z1}$ and $H_{Z2}$; and calculating azimuth A using $H_{ZE}$ which is free of axial magnetic field errors.

2. A method of surveying a wellbore according to claim 1, wherein said step of determining a best estimate includes:

numerically quantifying numerical confidence indicators for estimated values $H_{Z1}$ and $H_{Z2}$.

3. A method of surveying a wellbore according to claim 2, wherein, said step of determining a best estimate comprises:

determining a best estimate of an axial component of said magnetic field from $H_{Z1}$ and $H_{Z2}$ utilizing said numerical confidence indicators.

4. A method of surveying a wellbore according to claim 3, wherein said confidence indicators are utilized to generate a weighted value which represents said best estimate of said axial component $H_{ZE}$ of said magnetic field.

5. A method of surveying a wellbore, at a particular geographic location, utilizing a sensor array located within a drillstring within said wellbore, comprising:

measuring magnetic and gravitational fields with said sensor array at a particular depth;

utilizing a combination of (a) expected values for magnetic field strength and dip angle of said magnetic field and (b) measurements from said sensor array, to calculate a plurality of estimates of an axial component of said magnetic field;

blending said plurality of estimates of said axial component of said magnetic field to generate a composite estimate of said axial component of said magnetic field in a manner which emphasizes said estimates of said axial component of said magnetic field in proportion to confidence of accuracy; and utilizing said composite estimate of said axial component of said magnetic field to calculate at least one wellbore orientation indicator, which establishes wellbore position relative to earth's magnetic field, which is free of axial magnetic field errors.

6. A method of surveying a wellbore according to claim 5, further comprising:

generating a numerical indicator of confidence of accuracy for each of said plurality of estimates of said axial component of said magnetic field.

7. A method of surveying a wellbore according to claim 6, wherein said numerical indicator of confidence of accuracy is based upon measurements with said sensor array at a plurality of depths.

8. A method of surveying a wellbore according to claim 5, wherein, during said step of utilizing a combination:

said expected value of magnetic field strength is utilized to develop a first estimate of an axial component of said magnetic field, and said expected value of dip angle is utilized to develop a second estimate of an axial component of said magnetic field;

a first numerical indicator of confidence of accuracy is developed for said first estimate of an axial component of said magnetic field; and a second numerical indicator of confidence of accuracy is developed for said second estimate of an axial component of said magnetic field.

9. A method of surveying a wellbore according to claim 8, wherein, during said step of blending:

said composite estimate of said axial component of said magnetic field is calculated in a manner which weights said first and second estimates in proportion to said first and second numerical indicators of accuracy.

10. A method of surveying a wellbore according to claim 5, wherein said at least one wellbore orientation indicator comprises wellbore azimuth.

11. A method of surveying a wellbore according to claim 5, wherein said step of utilizing said composite estimate comprises:

utilizing said composite estimate of said axial component of said magnetic field to calculate directly, algebraically, and non-iteratively at least one wellbore orientation indicator, which establishes wellbore position relative to earth's magnetic field, which is free of axial magnetic field errors.

12. A method of surveying a wellbore, at a particular geographic location, utilizing a sensor array located within a drillstring within said wellbore, comprising:

measuring magnetic and gravitational fields with said sensor array at a particular depth;

utilizing a combination of (a) expected magnetic field strength at said particular geographic location and (b) measurements from said sensor array, to calculate a first estimate of an axial component of said magnetic field at said particular depth in said wellbore;

utilizing a combination of (a) expected magnetic dip angle at said particular geographic location and (b) measurements from said sensor array, to calculate a second estimate of an axial component of said magnetic field;

utilizing a combination of (a) said first and second estimates of said axial component of said magnetic field and (b) measurements from said sensor array, to calculate at least one wellbore orientation indicator which establishes wellbore position relative to earth's magnetic field which is free of axial magnetic field errors.

* * * * *